United States Patent Office 2,883,326
Patented Apr. 21, 1959

2,883,326

MAGNESIUM NICOTINATE-MAGNESIUM DEHYDROCHOLATE COMPOSITIONS FOR PERIPHERAL VASCULAR DISORDERS

Albrecht Heymons, Berlin-Nikolassee, Germany, assignor to Riedel-de Haen Aktiengesellschaft, Seelze, near Hannover, Germany, a corporation of Germany No Drawing. Application April 2, 1956
Serial No. 575,316

8 Claims. (Cl. 167—68)

The present invention relates to a pharmaceutical composition for treating peripheral vascular disorders and to a method of treating such disorders.

It is one object of the present invention to provide a new and highly effective pharmaceutical composition for the treatment of perpheral vascular disorders.

Another object of the present invention is to provide a simple and effective method of treating peripheral vascular disorders.

Other objects of the present invention and advantageous features thereof will become apparent as the description proceeds.

In principle, the pharmaceutical composition according to the present invention contains, as effective components, magnesium nicotinate and magnesium dehydrocholate in the proportion between about 1:1 and about 3:1 by weight.

For oral administration, the active ingredients of the new composition are used in the solid state, for instance, in the form of powders, dragees, and other solid preparations, and preferably in the form of tablets.

Such tablets, dragees, and other solid preparations weigh preferably between about 20 mg. and about 80 mg. They contain between about 15 mg. and about 25 mg. of magnesium nicotinate and between about 5 mg. and about 15 mg. of magnesium dehydrocholate. Of particular value have proved tablets weighing about 60 mg. and containing about 20 mg. of magnesium nicotinate and about 10 mg. of magnesium dehydrocholate.

The pharmaceutical composition according to the present invention can also be administered by intramuscular injection in the form of an aqueous solution containing between about 5% and about 10% of such a mixture of magnesium nicotinate and magnesium dehydrocholate. Said active ingredients are also present in such solutions in the proportion between about 1:1 and about 3:1 by weight and preferably in the proportion of 2:1 by weight. An injectable preparation which is especially suitable for intramuscular administration contains about 7.5% of the active ingredients, for instance, about 50 mg. of magnesium nicotinate and 25 mg. of magnesium dehydrocholate per cc.

The new pharmaceutical composition according to the present invention supplies the medical profession, for the first time, with a highly effective combination of magnesium nicotinate and magnesium dehydrocholate in a predetermined advantageous proportion. Such a combination in the above given proportion results in a high degree of efficiency. It causes a surprisingly rapid dilatation of the peripheral vessels, said dilatation extending into the terminal peripheral areas. As a result thereof and depending on dosage and mode of administration, a very pronounced circulatory improvement of the hypoxemic areas and, subjectively, a more or less rapid appearance of a sensation of heat are achieved.

Pharmaceutical compositions according to the present invention have proved of remarkable value in the treatment of peripheral circulatory disorders, such as, arteriosclerotic and so-called neutrovegetative circulatory disorders, and Raynaud's disease.

The recommended dose of the new compositions is, for instance, 1 to 2 tablets, each tablet containing 20 mg. of magnesium nicotinate and 10 mg. of magnesium dehydrocholate, taken orally three times daily after meals. A single daily intramuscular injection, for instance, of 1 cc. of a 7.5% aqueous solution containing 50 mg. of magnesium nicotinate and 25 mg. of magnesium dehydrocholate produces about the same results as the above described oral administration of tablets and the like solid preparations.

The following examples serve to illustrate the present invention without, however, limiting the same thereto.

*Example 1*

20 g. of magnesium nicotinate, 8.3 g. of magnesium dehydrocholate, 4.2 g. of aluminum hydroxide, 4.2 g. of lactose, 10.7 g. of potato starch, 3.9 g. of talc and 0.43 g. of magnesium stearate are intimately mixed and granulated with 13.3 g. of ethylether and 13.3 g. of ethanol. The granules are powdered and dried and then intimately mixed with 3 g. of talc. The mixture is tableted yielding 1000 tablets. Each tablet contains 20 mg. of magnesium nicotinate and 8.3 mg. of magnesium dehydrocholate.

*Example 2*

20 g. of magnesium nicotinate, 20 g. of magnesium dehydrocholate, 35 g. of potato starch, and 50 g. of lactose are intimately mixed and granulated with 3 g. of potato starch in the form of a 20% paste. The granules are mixed with 2 g. of stearic acid, tableted, and then coated with sugar coating to form 1000 dragees, each dragee containing 20 mg. of magnesium nicotinate and 20 mg. of magnesium dehydrocholate.

*Example 3*

To 800 cc. of distilled water for injection, U.S.P., there are added 60 g. of magnesium nicotinate and 20 g. of magnesium dehydrocholate and the mixture is stirred until complete solution is achieved. Sufficient distilled water for injection, U.S.P., is added to bring the volume of said solution to 1000 cc. The solution is filtered and filled into sterile glass ampoules each containing 1.1 cc. of solution. The sealed ampoules are sterilized by heating for about 30 minutes to about 115° C.

Other tableting adjuvants and diluting agents than those mentioned hereinbefore in the specification may, of course, also be used such as cornstarch, sugar, bolus alba, as binders, gelatin, pectin, gum arabic, methyl cellulose, yeast extract, as lubricant, magnesium stearate, and others as they are conventionally used in the pharmaceutical industry.

I claim:

1. A composition for treating peripheral vascular disorders comprising magnesium nicotinate and magnesium dehydrocholate in the proportion between about 1:1 and about 3:1 by weight.

2. A composition for treating peripheral vascular disorders comprising a mixture of solid magnesium nicotinate and solid magnesium dehydrocholate in the proportion between about 1:1 and about 3:1 by weight.

3. A composition for treating peripheral vascular disorders in dosage unit form comprising between about 15 mg. and about 25 mg. of magnesium nicotinate and between about 5 mg. and about 15 mg. of magnesium dehydrocholate per dosage unit, said composition being orally administrable.

4. A composition for treating peripheral vascular disorders in tablet dosage unit form comprising about 20 mg. of magnesium nicotinate and about 10 mg. of magnesium dehydrocholate per tablet dosage unit, said composition being orally administrable.

5. A composition for treating peripheral vascular disorders comprising between about 5% and about 10% of a mixture consisting of magnesium nicotinate and magnesium dehydrocholate in the proportion between about 1:1 and about 3:1 by weight and a sterile parenteral water diluent, said mixture being dissolved in said water diluent, said composition being adapted for intramuscular injection.

6. A composition for treating peripheral vascular disorders comprising between about 5% and about 10% of a mixture consisting of magnesium nicotinate and magnesium dehydrocholate in the proportion of about 2:1 by weight and a sterile parenteral water diluent, said mixture being dissolved in said water diluent, said composition being adapted for intramuscular injection.

7. A composition for treating peripheral vascular disorders comprising about 7.5% of a mixture of magnesium nicotinate and magnesium dehydrocholate in the proportion of about 2:1 by weight and a sterile parenteral water diluent, said mixture being dissolved in said water diluent, said composition being adapted for intramuscular injection.

8. A method of treating peripheral vascular disorders, said method comprising administering a composition comprising magnesium nicotinate and magnesium dehydrocholate in the proportion between about 1:1 and about 3:1 by weight to a patient suffering from such peripheral vascular disorders.

References Cited in the file of this patent

Merck Index, 6th ed., 1952, pp. 311 and 675, entries dehydrocholic acid and nicotinic acid, respectively.

Modern Drug Encycl., 6th ed., 1955, pp. 694, 695, 711, and 910, entries Neonic and Roniacol With Aminophylline.

Gehes Codex, Madon-Tafelchen, p. 566, 8th ed., 1953.

Kilma et al.: Wien. Med. Wichnschr., vol. 100, pp. 53–56, Jan. 14, 1950, Results of Bile Acids in Ther. of Angina Pectoris and Peripheral Vascular Diseases.

Gorbenko: Vestnik chir (No. 5), vol. 70, pp. 43–33, 1950, Magnesium in Therapy of Thrombophlebitis of Lower Extremities.